(12) United States Patent
Droscher et al.

(10) Patent No.: US 6,243,616 B1
(45) Date of Patent: Jun. 5, 2001

(54) METHOD AND DEVICE FOR PRODUCING THREE-DIMENSIONAL OBJECTS

(75) Inventors: Michael Droscher, Dorsten; Friedrich Georg Schmidt, Haltern, both of (DE)

(73) Assignee: Huels Aktiengesellschaft, Marl (DE)

( * ) Notice: Subject to any disclaimer, the term of this patent is extended or adjusted under 35 U.S.C. 154(b) by 0 days.

(21) Appl. No.: 09/107,412

(22) Filed: Jun. 30, 1998

(30) Foreign Application Priority Data

Jun. 30, 1997 (DE) .............................................. 197 27 677

(51) Int. Cl.[7] ..................................................... G06F 19/00
(52) U.S. Cl. ............................................. 700/118; 700/119
(58) Field of Search ............................ 700/98, 118, 119, 700/123, 212

(56) References Cited

U.S. PATENT DOCUMENTS

| 4,665,492 | 5/1987 | Masters . | |
|---|---|---|---|
| 5,121,329 | 6/1992 | Crump . | |
| 5,141,680 | 8/1992 | Almquist et al. . | |
| 5,545,367 | * 8/1996 | Bae et al. ............................... | 264/401 |
| 5,876,550 | * 3/1999 | Feygin et al. ......................... | 156/264 |
| 5,906,863 | * 5/1999 | Lombardi et al. ................. | 427/385.5 |
| 6,036,777 | * 3/2000 | Sachs ..................................... | 118/56 |

OTHER PUBLICATIONS

Robebert F. Schiffma, Encyclopedia of Chemical Processing and Design, vol. 30, pp. 202–228, "Microwave Technology and Applications", 1989.

Richard W. Grow, McGraw–Hill Encyclopedia of Science and Technology, 6th Edition, vol. 11, pp. 159–189, "Micorowave", 1987.

A. Gebhardt, Rapid Photocopying: Wekzeug für Schnelle Produktentwicklung, Hauser Verlag, pp. 1–3, 22–31, 42–71, 78–99, 114–119, 126–127, 132–135, 148–149, 158–163, 168–171, 245–155, and 2786, "Rapid Prototyping: A Tool For Rapid Product Develpment", 1996.

* cited by examiner

Primary Examiner—Dennis M. Butler
(74) Attorney, Agent, or Firm—Oblon, Spivak, McClelland, Maier & Neustadt, P.C.

(57) ABSTRACT

Method and device for producing three-dimensional objects in layers, comprising treating pulverulent, in particular, polymer, substrates or polymerizable monomers by means of microwave radiation.

21 Claims, 1 Drawing Sheet

METHOD AND DEVICE FOR PRODUCING THREE-DIMENSIONAL OBJECTS

FIELD OF THE INVENTION

This invention relates to a method and a device for producing three-dimensional objects using microwave radiation.

DISCUSSION OF THE BACKGROUND

The traditional development process for a product, which exhibits the diagrammatic stages of drawing—model—model refinement—design—prototype—small—scale production—large—scale production is much too slow for the product cycles of industrial manufacture, which are becoming ever shorter.

Methods have therefore been developed in order to bring products on more quickly and to avoid intermediate handcrafted stages from a design drawing to a prototype or to small-scale production. These methods are frequently summarized under the terms of "rapid prototyping" or "fast free form manufacturing".

By contrast with shaping methods, such as milling or casting, in rapid prototyping systems, three-dimensional objects are automatically manufactured without the use of means such as molds, by controlled and locally limited chemical reactions (for example polymerization) or physical conversion (smelting/solidification) from preliminary stages of the respective material.

Some rapid prototyping systems are already in industrial use and may be briefly sketched.

1) Selective laser sintering—In the laser sintering method (A. Gebhardt, "Rapid prototyping: Werkzeug für Schnelle Produktentwicklung" ["Rapid prototyping: a tool for rapid product development"], Hauser Verlag, Munich, Vienna 1996), pulverulent materials, usually plastics, are fused in layers by a laser to form an object. The powders used are preheated to just below the melting point of the material. The powders are fused (sintered) with one another under the action of the laser beam. The layer produced is then lowered by means of a suitable device, and a new layer of powder is applied to the already hardened layer and is in turn processed by the laser to produce the next object layer. The advantage of this technique is that it can be applied widely since, at least theoretically, all meltable pulverulent materials can be used. A disadvantage is the very rough surface of the objects produced and the fact that it is difficult to set the energy output of the laser. High laser energies do not lead to a sintering operation but to undesired complete melting of the powder grains, that is to say to a far reaching loss of the shaping properties. Excessively low energies particularly have the effect of fusing the layers to one another inadequately, with the result that the mechanical stability of the product produced is defective.

2) Thermal stereo lithography—U.S. Pat. Nos. 5,121,329 and 5,141,680 disclose methods in which a thermoplastic material is applied in layers by means of a nozzle. The material is applied, in a fashion capable of being shaped as a liquid or at least plastically, from the nozzle onto a support structure or onto already cooled layers, and solidifies in the desired shape. U.S. Pat. 4,665,492 describes a similar method; here, the liquefied material is applied by means of at least two independent particle canons. The extreme difficulty of controlling the resolution of detail is disadvantageous in these methods.

3) Stereolithography/photopolymerization—In methods of photo polymerization (A. Gebhardt, "Rapid prototyping: Werkzeug für Schnelle Produktentwicklung" ["Rapid prototyping: A tool for rapid product development"], Hauser Verlag, Munich, Vienna 1996), liquid monomers or oligomers are crosslinked to form a solid polymer under the action of UV radiation. The mostly free-radical polymerization can be initiated and terminated again by the decomposition of a photo initiator. Acrylate mixtures or epoxy resins are used as monomers, and UV lasers or UV lamps with a mask stop are used as light sources.

The object is also built up in layers. After one layer has been produced photochemically and polymerized out, new monomer is applied to the existing layer and induced to polymerize by radiation. The application of the new monomer layer can, for example, be performed by lowering the cured layer in a storage tank of the monomer. This method permits three-dimensional objects with complex cavities to be produced. Supplying energy by a laser is a problem, since the injected energy depends on the depth of penetration, that is to say the surface energy of the laser, the optical properties of the monomer mixture and the wavelength of the laser radiation employed.

The rapid prototyping methods described in the prior art have the common disadvantage that it is difficult to control the supply of energy, whether for melting powder particles or for initiating chemical reactions. This control is particularly problematic in the case of relatively large layer thicknesses, since the local energy intensity depends strongly on the depth of penetration. Relatively large local energy intensities such as are required for relatively large depths of penetration are, however, only connected with a relatively high thermal loading, or loading due to radiation chemistry, of the material employed. Higher energy intensities or a corresponding lengthening of the time over which energy is supplied are frequently not desirable with regard to thermally unstable materials.

SUMMARY OF THE INVENTION

It is the object of the present invention to provide a rapid prototyping method which can be used to produce three-dimensional objects. The energy required for shaping is to be largely independent of the thermal loading and/or loading due to radiation chemistry of the substrate.

Surprisingly, it has been found that the energy required to produce three-dimensional objects in layers in rapid prototyping systems can be supplied by microwave radiation.

The subject-matter of the present invention is therefore a method for producing three-dimensional objects in layers, wherein the energy required to produce the three-dimensional object is supplied by microwave radiation.

The method according to the invention permits a three-dimensional object to be built up in layers automatically by microwave irradiation of a suitable substrate.

Furthermore, the subject-matter of the present invention is a device for producing three-dimensional objects in layers, defined in that the device comprises a microwave generator which supplies the energy required to produce the three-dimensional objects.

A possible embodiment of the device according to the invention consists in that the energy required to produce the three-dimensional objects is directed in the form of microwave radiation onto a substrate via a device which can move in all directions in space.

Another embodiment of the device according to the invention is defined by producing three-dimensional objects in layers, the energy required to produce the three-dimensional objects being directed, via a device which can move in the x,y-plane, in the form of microwave radiation onto a substrate which is located on or in a device which can move in the z-direction.

The method according to the invention is preferably designed such that the layers generated in the production of the three-dimensional objects are interconnected.

This can be performed, for example, by partially fusing the layers, by simple adhesion of the layers with one another or by graft polymerization.

The first step in the method according to the invention is to provide the required three-dimensional information on the geometry of the objects to be produced. This can be performed by computer-aided compilation of a design plan or by measuring an object to be reproduced and subsequently processing the data thus obtained with the aid of commercially available CAD programs (Computer aided design) such as, for example, AUTOCAD. This information must now be converted, advantageously using the same CAD program, into a layer model with a layer thickness which depends on the desired precision of the object to be produced ("slicing). This process is not limited only to generating mathematical layers, but also comprises introducing support functions for structurally weak components or compounds found in cavities. The layers thus produced are normally 0.1 to 3 mm thick and represent the actual structural information for the manufactured unit.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings, wherein.

Figure 1:
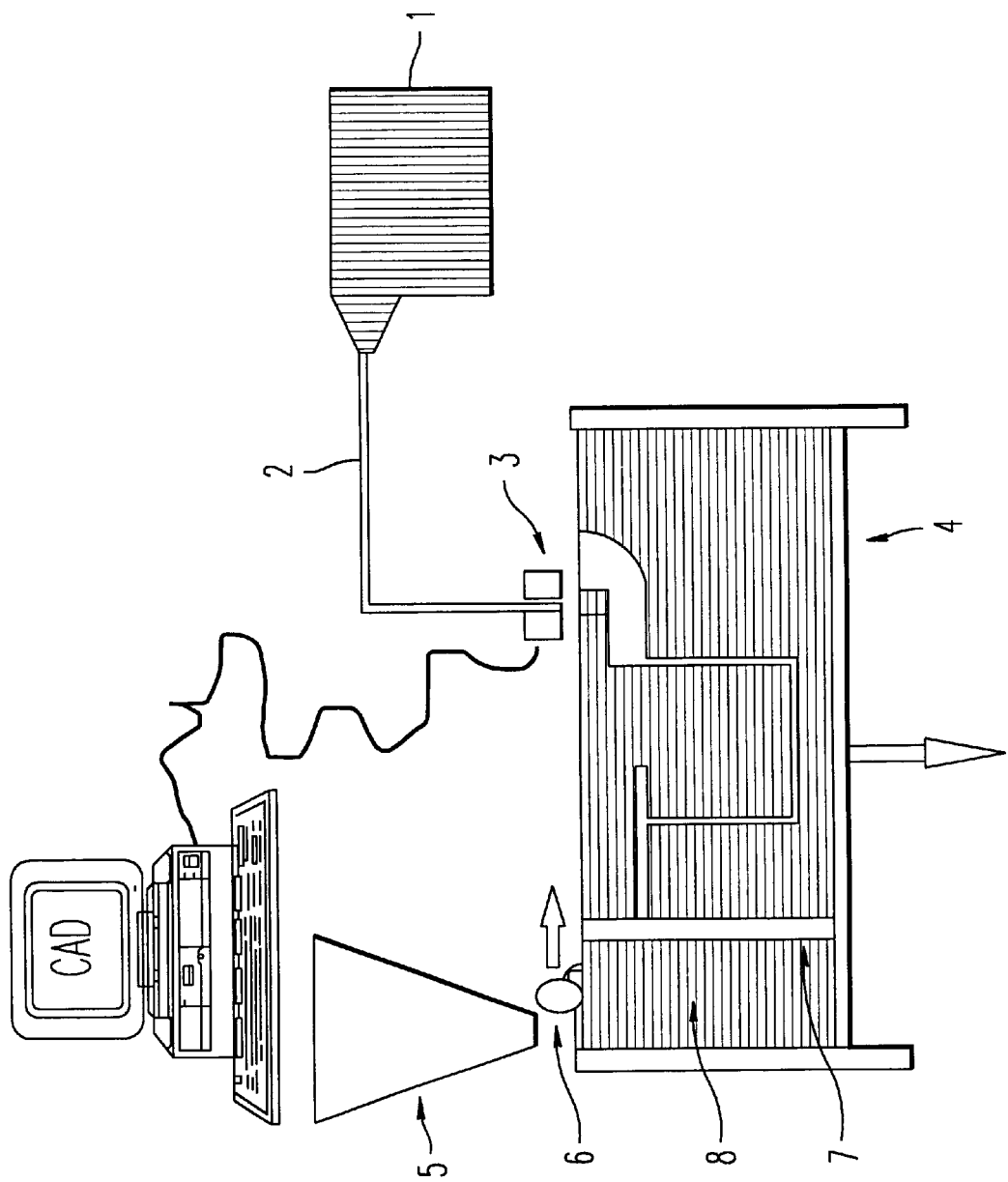
FIG. 1 depicts a microwave generator (1) which supplies microwave radiation via a guidance system (2) to an arm, which can be moved in the x,y-plane and supports the transmitting unit (3) for the microwave radiation. The transmitting unit (3), constructed as a microwave probe, can include focusing of the microwave radiation, if appropriate. The table (4), which can move on the z-axis, can be lowered in accordance with the desired layer thickness calculated in the slicing process, while the movable arm (3) coordinates the distribution of the microwave radiation in the plane of the table. The pulverulent substrate taken from the storage tank (5) is applied in a defined layer thickness in the plane of the table by means of a doctor knife (6). The microwave probe (3) then transmits the microwave radiation and thereby generates in layers the three-dimensional object (7), which is surrounded by the non-converted pulverulent substrate (8). The substrate (8) not required can be reused, if appropriate after preparation (for example screening).

In another variant of the present invention, the table is of stationary design, while the arm supporting the transmitting unit for the microwave radiation can move in all directions in space.

The movable parts of the device (microwave probe (3) and table (4)) are preferably controlled by the CAD program or an additional program, which converts the CAD data into an appropriate industrial robot technique.

DESCRIPTION OF THE PREFERRED EMBODIMENTS

The microwave radiation required for the method according to the invention is generated by an external microwave generator and is in the frequency range of 300 MHZ to 300 GHZ. The frequencies used in industrial processes and requiring government clearance are usually 430 to 6800 MHZ (Encyclopedia of Chemical Processing and Design, Vol. 30, p. 202 ff, Marcel Dekker, N.Y.—Basel, 1989). The radiation emanating from the external microwave transmitter is possibly polarized and/or filtered and supplied to the substrate via the movable arm. Metal tubes or glass or plastic tubes metal-vapor-deposited inside and/or outside (Encyclopedia of Science & Technology, McGraw-Hill, vol.II, p. 159 ff, 6$^{th}$ Edition, 1987) are especially suited for the transport of microwave radiation. The transport of the microwave radiation is expediently performed in flexible pipes; however, box-shaped guidance systems are also conceivable. The diameter of the tubes should be selected such that the circumference is larger than the wavelength of the microwave radiation employed. The movable arm thus functions as the microwave probe and can, if appropriate, have devices for focusing the microwave radiation.

A microwave radiation in the frequency range of 430 to 6800 MHZ is used in the method according to the invention.

The microwave radiation is preferably focused onto a beam width of 0.1 to 3 mm, particularly preferably 0.3 to 1 mm.

The beam width simultaneously fixes the minimum web widths of the three-dimensional objects.

A possible embodiment of the present invention is a method in which the three-dimensional objects are produced by microwave-induced fusion of a pulverulent substrate.

This method according to the invention is carried out in a device by means of which the three-dimensional objects are produced by microwave-induced fusion of a pulverulent substrate.

The pulverulent substrate can have a grain size of 50 to 100 $\mu$m, and preferably contains polymers.

In addition to the table and the movable arm, which is designed as a microwave probe, the device according to the invention has a device for applying a defined quantity of the substrate powder to the object plane. This can be performed by means of an application roller, a doctor knife and/or a movable storage tank (see FIG. 1). The application of a uniform layer thickness is decisive for the quality of the object produced.

In the method according to the invention, it is possible to use all the pulverulent substrates which are heated by microwave radiation, that is to say have a dipolar basic structure. This includes polymers such as polyester, polycarbonates, polyamides, polyurethanes and/or ABS copolymers (acrylonitrile-butadiene-styrene copolymers), and also ceramic or metal powders coated with these polymers. Polyolefins or polystyrene are less suitable.

The pulverulent substrates used should have an adequate flowability in the heated state and a monomodal or bimodal grain size distribution. VESTOSINT® (Hüls AG, Marl), for example, is suitable.

The method according to the invention comprises the following steps, which are repeated cyclically:
  Application of a defined layer of substrate powder,
  Microwave irradiation of this layer by means of the
    microwave probe to produce a layer of the object which
    is firmly connected to an object layer which has already
    been produced, if appropriate,
  Lowering of the table by one layer thickness.

If the movable arm, which is designed as a microwave probe, can move in all directions in space, the table can be permanently installed. This method contains the following cycle:

application of a defined layer of substrate powder,

Microwave irradiation of this layer by means of the microwave probe to produce a layer of the object which is firmly connected to an already produced object layer, if appropriate, Raising of the microwave probe by one layer thickness.

In order to avoid possible undesired chemical reactions, the operation can be carried out under an inert gas such as argon or nitrogen with the exclusion of oxygen and water. In substrates which are not attacked by water, water adhering can act as a thermal transmitter and thus further improve the heat flow.

The energy injection required to fuse the pulverulent substrate can be minimized by already preheating the powder to a few degrees (2 to 5 K) below the melting point or glass transition temperature.

A further embodiment of the present invention is a method in which the material of a three-dimensional object is obtained by a microwave-induced polymerization.

This embodiment of the present invention is carried out in a device by means of which the material of the three-dimensional object is obtained by microwave-induced polymerization.

In this embodiment, the monomer mixture or a suitable prepolymer is polymerized locally in layers, using initiators if appropriate, by microwave radiation. The layers obtained in this way are polymerized with one another to form a strong bond, and thus build up the three dimensional object.

In this embodiment, the table of the device according to the invention is preferably constructed inside the monomer reservoir so that the layer thickness produced is a function of the level of the monomer mixture above the plane of the table.

This embodiment of the method according to the invention contains the following steps, which are repeated cyclically:

Lowering of the table by a defined measure below the surface of the monomer mixture, Microwave irradiation of this layer by means of the microwave probe, to produce a layer of the object which is strongly bonded to an object layer which has, if appropriate, already been produced.

A possible alternative method consists in abandoning a movable table and using a microwave probe which can be moved in all directions in space. The monomer mixture is resupplied so as to produce a defined layer of monomer mixture over the object to be produced which corresponds to the desired layer thickness.

This method includes the following cycle:

Application of a defined layer of monomer mixture,

Microwave irradiation of this layer by means of the microwave probe, in order to produce a layer of the object which is strongly bonded to an object layer which had, if appropriate, already been produced.

Raising the microwave probe by one layer thickness.

The monomer mixtures used for the microwave-induced polymerization can contain the following monomers: acrylates, vinyl ethers and/or epoxy resins as well as suitable initiators such as, for example, azobisisobutyronitrile or benzoyl peroxide or other initiators, which have a decomposition half life period in the range of seconds under the operating temperatures.

Furthermore, the monomer mixture can contain polymerizable oligomers or prepolymers made from these monomers.

In the case of free-radical polymerizations, in particular, work should be done under an inert gas such as nitrogen or argon, or with the exclusion of oxygen and water.

The complete curing of the object can be carried out, if appropriate, after conclusion of the shaping steps under UV radiation.

The method of microwave radiation according to the invention has the following advantages by comparison with, for example, laser irradiation:

the substrate is heated by direct absorption of the radiation ("internal friction") and not purely thermally. Local overheating can thus be avoided.

the depth of penetration of the microwaves is a function only of the dielectric properties and not of optical characteristics of the substrate. Fillers can thus be added without a problem; it is also possible to realize larger depths of penetration than in the case of laser methods.

Lasers of sufficient power ($CO_2$ lasers or YAG lasers) are very expensive. Their power output can be regulated only in narrow frequency ranges and intensities. Microwave generators are of simple design, and are therefore cost-effective and their power output can be regulated over wide ranges by diplexers or amplifiers.

To the person skilled in the art, knowledge of the concept of the invention opens up further embodiments of the method according to the invention and of the device according to the invention.

The invention is explained in more detail by the following example, without being limited thereto:

EXAMPLE

A beaker-shaped sample with the dimensions of: diameter 5 cm, height 10 cm and wall thickness 2 mm and made of nylon-12 powder (VESTOSINT®, Hüils Company, Marl) is produced in the device described in FIG. 1.

A 2 mm thick plastic tubelet (wall thickness 0.2 mm), which is metallized on the inner side and positioned in the xly-plane, is used as wave guide. The device is purged with dry nitrogen, and has an operating temperature of 160° C. The frequency of the microwave generator is 2450 MHZ.

Obviously, numerous modifications and variations of the present invention are possible in light of the above teachings. It is therefore to be understood that within the scope of the appended claims, the invention may be practiced otherwise than as specifically described therein. German patent application 197 27 677.6, filed on Jun. 30, 1997 and from which this application claims priority, is herein incorporated by reference.

What is claimed is:

1. A method for producing three-dimensional objects in layers, comprising:
   (a) providing three-dimensional information on the geometry of the three-dimensional object to be produced;
   (b) converting said information into a layer model with a layer thickness which depends on the desired precision of the object to be produced;
   (c) applying a pulverulent substrate onto a surface in a desired uniform thickness;
   (d) irradiating said pulverulent substrate with microwave radiation generating a first layer of said three-dimensional object; and
   (e) applying subsequent layers of pulverulent substrate in a desired uniform thickness onto said first layer; and
   (d) irradiating said layers of pulverulent substrate after each application such that said layers are firmly connected to each other.

2. The method of claim 1, wherein step (a) is performed by computer-aided compilation of a design plan or by measuring said object to be reproduced and subsequently processing the data thus obtained with the aid of a computer-aided design (CAD) program.

3. The method of claim 2, wherein step (b) is performed using a computer-aided design program (CAD).

4. The method as claimed in claim 1, wherein said irradiating step causes said pulverulent substrate to become fused.

5. The method as claimed in claim 4, wherein the pulverulent substrate has a grain size of 50 to 100 $\mu$m.

6. The method as claimed in claim 1, wherein the pulverulent substrate is comprised of polymers.

7. The method as claimed in claim 6, wherein the pulverulent substrate comprises polyesters, polycarbonates, polyamides, polyurethanes and/or ABS copolymers.

8. The method as claimed in claim 1, wherein said pulverulent substrate is comprised of monomers or prepolymers which are polymerized locally in layers by said microwave irradiation.

9. The method as claimed in claim 8, wherein the monomers used for the microwave-induced polymerization comprise acrylates, vinyl ethers and/or epoxy resins.

10. The method as claimed in claim 1, wherein microwave radiation in the frequency range of 430 to 6800 MHZ is used to irradiate said pulverulent substrate.

11. The method as claimed in claim 1, wherein the microwave radiation is focused onto said pulverulent substrate using a beam width of 0.1 to 3 mm.

12. The method as claimed in claim 11, wherein the microwave radiation is focused onto said pulverulent substrate using a beam width of 0.3 to 1 mm.

13. A device for producing three-dimensional objects in layers, comprising:

(a) means for providing three-dimensional information on the geometry of a three-dimensional object to be produced;

(b) means for converting said information into a layer model with a layer thickness which depends on the desired precision of the object to be produced;

(c) a surface on which to apply a pulverulent substrate;

(d) means for applying said pulverulent substrate to said surface; and (e) a microwave generator which supplies a microwave radiation required to produce the three-dimensional objects.

14. The device of claim 13, wherein the microwave generator in (e) contains a probe which comprises means for moving in all directions in space, to direct said microwave radiation onto said pulverulent substrate.

15. The device of claim 14, wherein said means for moving in all directions in space, to direct said microwave radiation onto said pulverulent substrate comprises a moveable arm.

16. The device of claim 15, additionally comprising a computer-aided design (CAD) program which controls said moveable arm by converting data on the three-dimensional geometry of the object to be produced into an industrial robotic technique.

17. The device of claim 13, wherein said means for providing three-dimensional information on the geometry of the three-dimensional object to be produced comprises a computer-aided design (CAD) program.

18. The device of claim 13, wherein said means for converting said information into a layer model with a layer thickness which depends on the desired precision of the object to be produced comprises a computer-aided design (CAD) program.

19. The device of claim 13, wherein said means for applying said pulverulent substrate to said surface in (c) comprises a roller, a doctor knife a movable storage tank or a combination thereof.

20. The device of claim 13, wherein the microwave generator in (e) contains a device which comprises means for moving in the x,y-plane to direct said microwave radiation onto said pulverulent substrate and said surface (c) comprises means for moving in the z-direction.

21. The device of claim 13, wherein said surface is a table.

* * * * *